(12) United States Patent
Sterin et al.

(10) Patent No.: US 10,235,417 B1
(45) Date of Patent: Mar. 19, 2019

(54) PARTITIONED SEARCH OF LOG EVENTS

(71) Applicant: Amazon Technologies, Inc., Seattle, WA (US)

(72) Inventors: Greg Sterin, Seattle, WA (US); Daniel Vassallo, Seattle, WA (US); Robert Mark Waugh, Seattle, WA (US); Emmanuel Pierre Devillard, Issaquah, WA (US); Nitin Kesarwani, Seattle, WA (US); Hongqi Wang, Seattle, WA (US); Sheikh Naveed Zafar, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 14/843,850

(22) Filed: Sep. 2, 2015

(51) Int. Cl.
G06F 17/30 (2006.01)

(52) U.S. Cl.
CPC .... G06F 17/30486 (2013.01); G06F 17/3053 (2013.01); G06F 17/30185 (2013.01); G06F 17/30864 (2013.01)

(58) Field of Classification Search
CPC ......... G06F 17/30516; G06F 17/30336; G06F 17/30321; G06F 17/30342; G06F 17/30353; G06F 17/30528; G06F 17/3053; G06F 17/30551; G06F 17/30554; G06F 17/30864; G06F 11/1435; G06F 17/2705; G06F 17/301
USPC ...................................................... 707/725
See application file for complete search history.

(56) References Cited

U.S. PATENT DOCUMENTS

| | | | | |
|---|---|---|---|---|
| 9,514,199 | B1* | 12/2016 | Deprey | G06F 17/30899 |
| 2003/0130894 | A1* | 7/2003 | Huettner | G06Q 30/0257 |
| | | | | 705/14.55 |
| 2004/0120013 | A1* | 6/2004 | Elkady | G06K 15/00 |
| | | | | 358/1.18 |
| 2006/0193008 | A1* | 8/2006 | Osaka | G06F 17/211 |
| | | | | 358/1.18 |
| 2007/0168336 | A1* | 7/2007 | Ransil | G06F 17/3089 |
| 2007/0260575 | A1* | 11/2007 | Robinson | G06F 17/30348 |
| 2008/0028293 | A1* | 1/2008 | Seliutin | G06F 17/30011 |
| | | | | 715/234 |
| 2008/0040162 | A1* | 2/2008 | Brice | G06F 17/243 |
| | | | | 705/3 |
| 2008/0147812 | A1* | 6/2008 | Curtis | G06Q 10/10 |
| | | | | 709/206 |
| 2008/0256517 | A1* | 10/2008 | Atkin | G06F 11/3688 |
| | | | | 717/124 |

(Continued)

*Primary Examiner* — Shyue Jiunn Hwa
(74) *Attorney, Agent, or Firm* — Thorpe North & Western, LLP.

(57) ABSTRACT

A technology is provided for enabling a partitioned search to be performed on log events from multiple log streams that are stored by multiple hosts. A search query may be submitted to identify the log streams whose log events are to be searched and to indicate a time interval in which log events are to have occurred as indicated by the log events' time stamps. The multiple hosts may search stored log events in parallel and return a set of log-event search results satisfying the search query. A pagination token can be included with the set of log event search results. The pagination token may be used to resume the search if the multiple hosts were not able to completely finish searching the stored log events before the set of log-event search results had to be returned to prevent a timeout of a search client.

16 Claims, 7 Drawing Sheets

(56) References Cited

U.S. PATENT DOCUMENTS

| | | | | |
|---|---|---|---|---|
| 2011/0035390 A1* | 2/2011 | Whitehouse | ........ | H04L 63/1425 |
| | | | | 707/755 |
| 2012/0197928 A1* | 8/2012 | Zhang | ............... | G06F 17/30545 |
| | | | | 707/769 |
| 2012/0197934 A1* | 8/2012 | Zhang | ............... | G06F 17/30516 |
| | | | | 707/770 |

* cited by examiner

PARTITIONED SEARCH OF LOG EVENTS

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Virtualized computing resources may be configured to provide software services (e.g., business software, content management software, data processing software, etc.) and application resources. Accordingly, software service and application functionality may generate one or more log streams of log events pertaining to the software service and application functionality. A group of aggregated log streams may be associated with a single log group that is associated with the software service and application functionality.

DETAILED DESCRIPTION

A technology is provided to enable a partitioned search to be performed on log events from multiple log streams that are stored (e.g., cached) by multiple log hosts. A user may, for example, have reporting access to software service or application functionality that is being monitored and is providing log streams within a service provider environment. The user may wish to inspect log events that are associated with a log group (e.g., a group of log streams that share the same properties, policies, and access controls) or are otherwise associated with the software service and application functionality.

For example, a user may input desired search criteria for a log-event search into a single interface of a partitioned log-event search service provided by the computing service provider. Based on the search criteria provided, the partitioned log-event search service can identify the log hosts (e.g., servers or computing instances) that have cached log events for log streams meeting the desired search criteria. The log-event search service may then query the log hosts in parallel for cached log events matching the search criteria. The queried log hosts may search the cached log events in parallel and return the log-event search results to the log-event search service. The log-event search service may then compile the log-event search results received from the queried computing instances into a list or a page.

There may be a large number of log streams to search and new log events may be continually produced for any given log stream. Consequently, performing a complete search of log events from log streams in a log group at one time and returning the search results promptly enough to ensure that the user is satisfied may be impractical. The user, for example, may wish to receive search results relatively quickly (e.g., under a few seconds) after the search criteria are submitted.

Accordingly, the log-event search service may therefore search for log events that occurred during a specific period of time. The user may provide a starting time, an ending time, or both. Alternatively, the log-event search service may select a starting time and an ending time automatically based on one or more rules. Log events matching the search criteria and having time stamps ranging from the starting time to the ending time can be compiled into a first page of search results that is returned to the user. In addition, the log-event search service may also send a pagination token to a search client. The pagination token may identify the log streams that were included in the search and may also include a time stamp of the last log event included in the first page of search results. The time stamp of the last log event may, in some examples, serve as the ending time for the first page of log-event search results. The pagination token may also include any additional searching criteria that were input by the user when the search was initiated.

The search client may then send a request for a second page of search results. As part of the request for the second page of search results, the search client can include the pagination token that was received with the first page of search results. The log-event search service may then use the pagination token to resume the search. For example, the log-event search service may query, in a parallel fashion, the log hosts (e.g., computing instances) that have log streams identified by the pagination token. The queried log hosts (e.g., computing instances) may return the log-event search results in parallel that match the searching criteria (including the starting time that is the ending time of the previous page of search results) provided by the pagination token and that have time stamps after the time stamp provided in the pagination token (e.g., the starting time for the second page of search results) and before an ending time. The log-event search service may then compile a second page of log-event search results received from the queried log hosts. The second page of log-event search results can be sent to the search client along with a second pagination token. The second pagination token may identify the log streams that were included in the search and may also include a time stamp of the last log event included in the second page of search results.

This process can be repeated until the search client or the user elects to stop requesting additional pages of log-event search results or until a last page of log-event search results is provided to the user or to the search client. For example, an $n^{th}$ page of search results can be sent to the user with an $n^{th}$ pagination token, wherein the starting time of the $n^{th}$ page of log-event search results is the ending time of the $n-1^{th}$ page of log-event search results and the ending time of the $n^{th}$ page of log-event search results is the starting time of the $n+1^{th}$ page of log-event search results. The $n^{th}$ pagination token may identify the log streams selected for the search (e.g., a batch of streams in a log group), include the search criteria provided by the user when the search was initiated, and include the ending time of the $n^{th}$ page of log-event search results. Alternatively, if the $n^{th}$ page contains the last log events that match the search criteria, a null value (or some other value indicating a terminus) can be sent for the $n^{th}$ pagination token.

This technology may allow the user to receive search results incrementally, in a piecewise or paged fashion, at a rate sufficient to prevent a searching interface application from timing out. Furthermore, examples of the current technology also allow the search to be paused (e.g., by waiting to send a pagination token indicating some query parameters for a next page of search results) and resumed at a later time when the user so desires (e.g., by sending the pagination token that was received with the latest page of search results).

Figure 1:
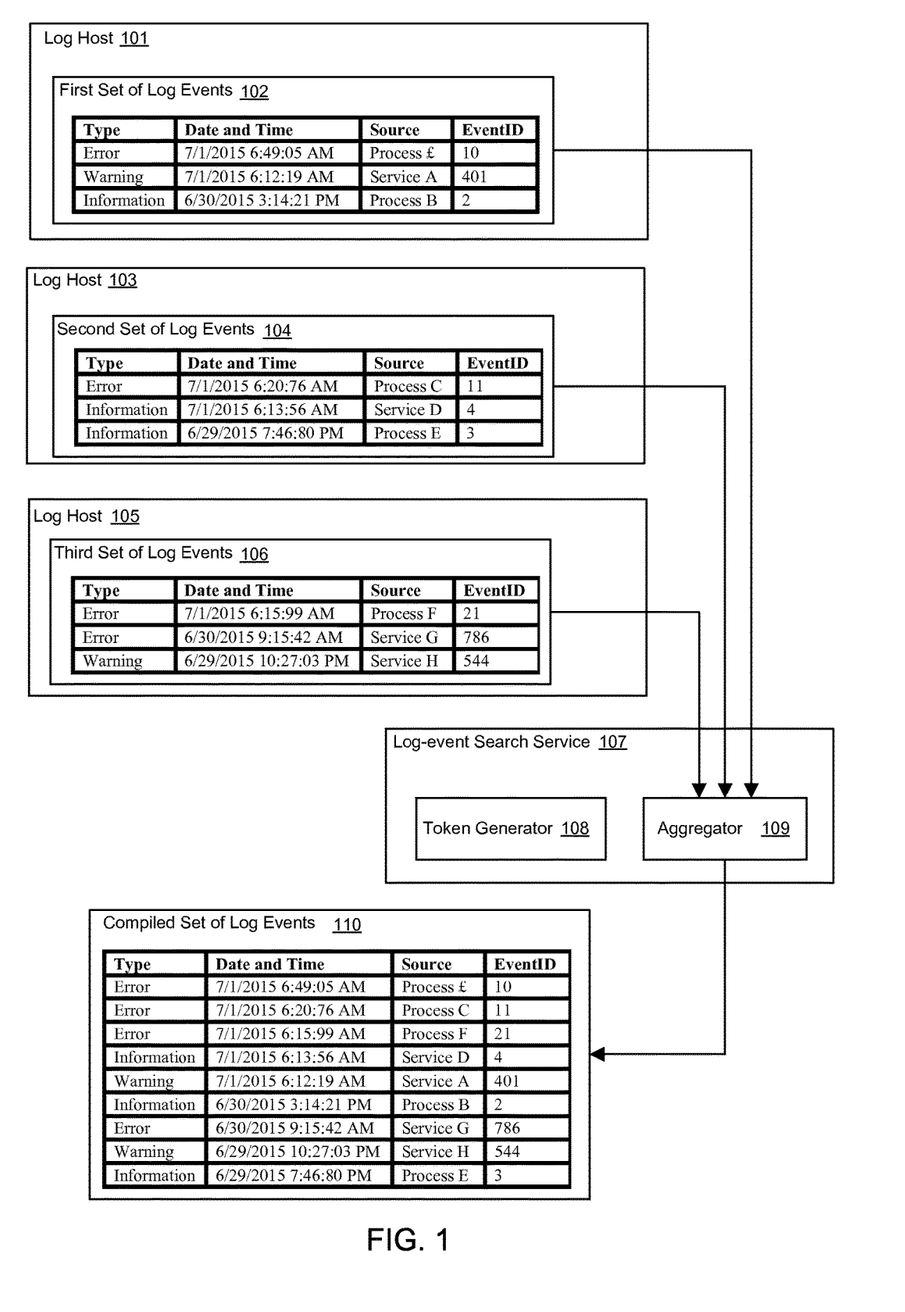
FIG. 1 is a diagram illustrating an exemplary flow of log-event data in a log-event searching service.

FIG. 1 is a diagram illustrating an exemplary flow of log-event data in a log-event searching service. A log-event search service 107 that uses partitioning may receive a search query to be applied to log events in log streams that belong to a selected log group. The log-event search service 107 may ascertain that each log host 101, log host 103, and log host 105 stores or hosts one or more log streams that belong to the log group. The log-event search service 107 may then send the search query to log hosts 101, 103, and 105 and request that each log host apply the search query to cached log events in log streams belonging to the selected log group. The log host 101 may identify a first set of log events 102 that are cached by the log host 101. The second log host 103 may identify a second set of log events 104 that are cached by log host 103, and the third log host 105 may identify a third set of log events 106 that are cached by log host 105. Though three log hosts are shown in this example, more or less log hosts may be used.

In some examples, the log-event search service 107 may also request that each log host return matching search results that have been identified before a predefined amount of time elapses. If a log host (e.g., log host 101, log host 103, or log host 105) has not been able to finish searching the log events cached at the respective host before the predefined amount of time elapses, a set of log events (e.g., the first set of log events 102, the second set of log events 104, or the third set of log events 106) may simply comprise the cached log events that could be identified before the predefined amount of time elapses.

The first set of log events 102, the second set of log events 104, and the third set of log events 106 may then be sent to an aggregator 109 (e.g., an aggregator module) in the log-event search service 107. The aggregator 109 may aggregate the first set of log events 102, the second set of log events 104, and the third set of log events 106 into a compiled set of log events 110. In one example, the aggregator may sort the log events in the compiled set of log events based on time stamps. A token generator 108 (e.g., a token generator module) may generate a pagination token that identifies the log group (and/or a sub-batch of log streams from the log group that are being currently searched) and includes a time stamp of the last log event included in the compiled set of log events 110. In some examples, the pagination token may also include any additional searching criteria that were included in the search query.

The log-event search service 107 may then send the pagination token and the compiled set of log events 110 to a search client that submitted the search query. The client, in turn, may subsequently send the pagination token to the log-event search service 107 to resume the search. If the compiled set of log events 110 did not result in a complete set of the queried log events cached at the log hosts 101, 103, and 105 (e.g., because the predefined amount of time elapsed before the cached log events could be identified), the search client may resume the search, if desired.

In this manner as described for FIG. 1, the technology of the present disclosure enables a parallelized search of a set of log streams to be partitioned. This technology provides a number of results. For example, a user that sends a search query may be using a searching interface that may "time out" if search results are not returned within a predefined amount of time after the search query is submitted. If a time-out occurs, the searching interface may essentially stop waiting to receive search results. Such a time-out is generally meant to keep an operation from waiting indefinitely to receive data that, for one reason or another, may not ever arrive. However, if there are many log streams or log events that need to be searched, it may take a comparatively long time to identify and retrieve a complete set of queried log-event search results. As a result, the searching interface used by the user to submit the query may time-out before the complete set of matching log-event search results is returned. Thus, the current technology may send the results to the search client in pages and avoid potential time-out problems.

The present technology may also assist users in better searching a large group of log streams that have a large volume of log events. Specifically, users are able to avoid manually identifying which log hosts have log streams associated with the log group. In addition, the users are able to avoid performing a separate individual search on each log stream and are able to avoid manually compiling the results of the individual searches into an aggregated list. Rather, a group log streams can be specified by a user and searched in an automated fashion without necessitating additional user input.

Figure 2:
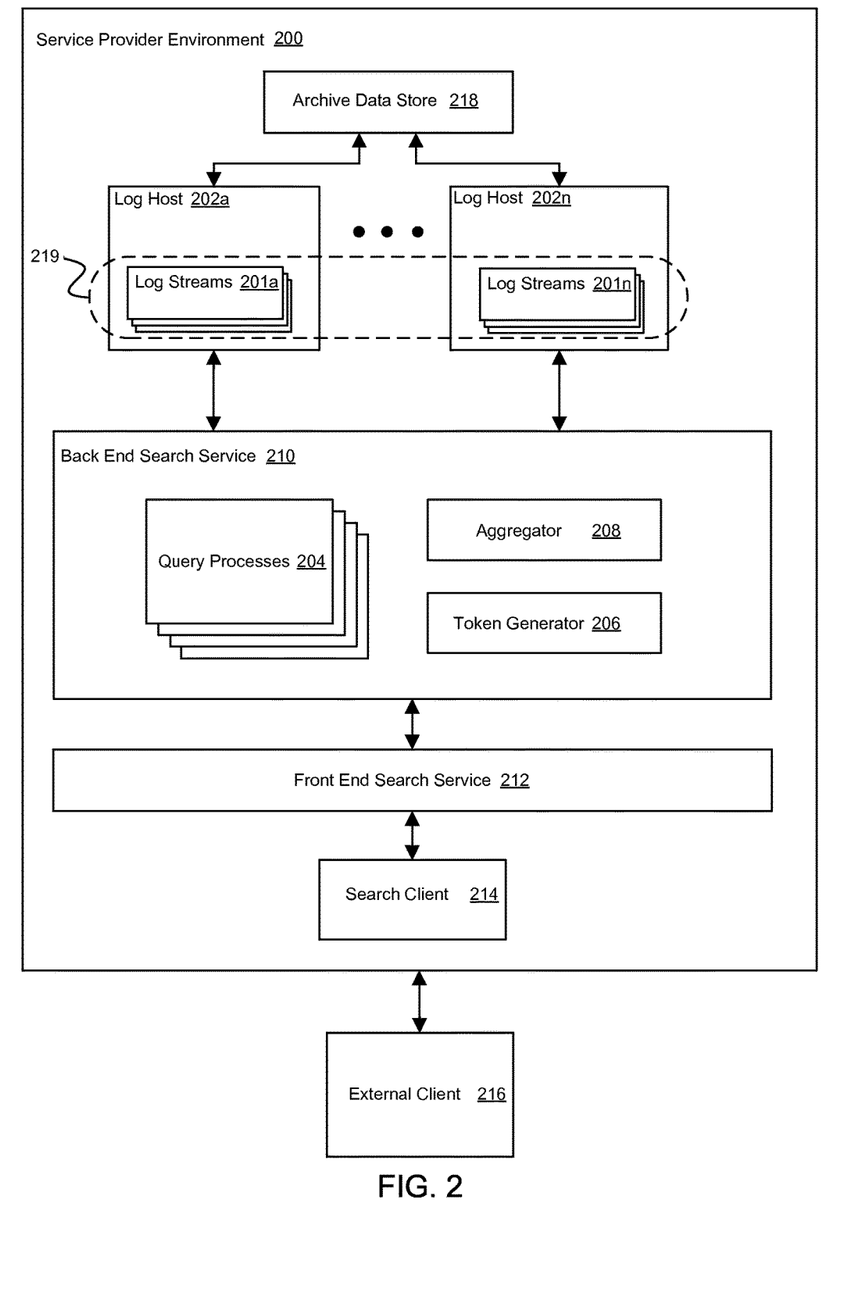
FIG. 2 is a diagram illustrating an exemplary system of a log-event searching service in accordance with an example.

FIG. 2 is a diagram illustrating an exemplary system of a log-event searching service in accordance with an example. Log events (e.g., metric logs for the virtualized services) for services being used by a customer of virtualized computing resources may be collected on log hosts 202a-n in a service provider environment 200. The number of log hosts 202a-n may vary according to the number of log streams hosted and the types of log streams being collected. The log hosts 202a-n may host a plurality of log streams 201a-n and the log streams 201a-n may belong to a log group 219. Many different distributions of the log streams 201a-n amongst the log hosts 202a-n are possible. For example, some log hosts may host may host only a few of the log streams 201a-n, while other log hosts may host larger numbers of the log streams 201a-n.

A log stream may comprise, for example, a sequence of log events from a particular source (e.g., a service). Examples of sources that may produce log events may include, for example, application instances, computer hardware, computing instances, storage resources, networking resources and services, and other services that are being monitored within the service provider environment 200. Because log events may enter a log stream in chronological order, log events of a stream may be cached in chronological order. A log event may include, for example, an event name, a time stamp, an event identification (event ID), a source identification (source ID), a type, and/or raw message data describing the event. A log group may comprise, for example, a group of log streams that have similar properties, policies, or access controls.

The customer of virtualized computing resources in the computing service environment 200 may wish to find log events associated with the virtualized computing resources that match or satisfy a particular search query. A search query may identify a log group of interest, and the search query may include one or more keywords. In some examples, a search query may also include a starting time to indicate that log events with time stamps after the starting time (or, in some examples, equal to or after the starting time) should be included in search results. A search query may also comprise an ending time to indicate that log events with time stamps before the ending time (or, in one example, equal to or before the ending time) should be included in search results. The search query may also contain one or more log-event types to indicate that log events of the one or more types should be included in search results.

An external client 216 may ultimately receive a search query from the customer of the virtualized computing resources. The external client 216 may be, for example, a computing device with an interface (e.g., a command-line interface or a graphical user interface) through which the customer inputs the search query using a keyboard, a pointing device, a touch screen, or some other peripheral user-input device. The external client 216 may then send the search query to a search client 214 in the service provider environment 200 via a network connection (e.g., a wired or wireless internet connection). The search client 214 may be, for example, an application executing within the service provider environment 200 (e.g., an analysis application to further analyze or report metric trends, problems, errors, etc.), a physical computing device, a virtual computing instance using physical computer resources (e.g., processors and digital memory) on one or computing devices, or a search-client processor (e.g., a software or hardware component configured to perform the functions of the search client).

The search client 214 may send the search query to a front end search service (e.g., a software module configured to perform the functions of the front end search service) in the service provider environment 200. The front end service 212 may perform one or more pre-processing functions on the search query. For example, the front end service 212 may convert the search query into a format that can be readily used by the back end search service 210 and may verify that parameters contained in the query are valid. For example, the front end service 212 may verify that no illegal characters are included in query search terms, verify that a specified start time in the search query is before a specified end time, verify that a specified log group to which the search query is to be applied exists, or verify that a specified type in the search query is a valid log-event type. In some examples, if no end time was specified in the search query, the time at which the query was submitted may be used as the end time by default.

The front end search service 212 may then forward the search query to the back end search service 210. The back end search service 210 may identify the log streams 201a-n belonging to the log group 219 to be searched that are hosted and cached by the log hosts 202a-n. In some examples, the back end search service 210 may identify a sub-batch (e.g., a subset) of log streams selected from the log streams 201a-n belonging to the log group 219. This may be prudent, for example, if the number of log streams belonging to the log group is relatively large. The search may be performed incrementally on a single sub-batch of log streams at a time. When searching of the log streams in a current sub-batch is complete, the search may continue on to additional sub-batches until a search of the log streams in the log group is completed. The number of logs streams in a batch or sub-batch that may be processed at in a time frame may be determined by memory, processor, or networking constraints.

In some examples, log events for the log streams 201a-n may be cached for a limited amount of time at the log hosts 202a-n. Log events that are no longer cached at log hosts 202a-n may be archived in an archive data store 218. Based on a start time or an end time included in the search query, the back end search service 210 may determine that some log events matching the search query are archived in the data store 218.

The back end search service 210 may then initiate query processes 204. The query processes 204 may send a portion or segment of the search query to each of the log hosts 202a-n and request that each of the log hosts 202a-n perform a search on log events cached at the respective log host using the search query. The log hosts 202a-n may then return search results from the log streams 201a-n in the log group 219 (or in the sub-batch of log streams) matching the search query. There may, in some examples, be other log hosts in the service provider environment 200 that do not host any of the log streams 201a-n that belong to the log group 219, and the search query is not sent to these other log hosts. In examples where the back end search service 210 has determined that some log events matching the search query are archived in the archive data store 218, the archived log events or metrics may be retrieved from the archive data store 218 to the log hosts 202a-n for searching. Alternatively, the archive data store 218 may be queried directly, in parallel, for log events matching the search query.

In one configuration, the query processes may also indicate to the log hosts 202a-n (and to the archive data store 218, when applicable) that log-event search results matching the query are to be returned within a predefined amount of time. Once the predefined amount of time expires, the log hosts 202a-n (and to the archive data store 218, when applicable) may return the log-event search results that were identified before the predetermined amount of time expired even if a complete search of cached log events in the log streams 201a-n that were searched was not completed during the predetermined amount of time (e.g., because there were a very large number of log events cached at the log hosts 202a-n or stored in the archive data store 218).

In some examples, the log hosts 202a-n (and the archive data store 218, when applicable) may search cached log events in each respective log stream in the log streams 201a-n sequentially and in ascending order (i.e., most earliest time first) according to the log events' respective time stamps and commencing at a start time specified in the search query. As a result, log-event search results from a log stream identified during the predetermined amount of time may represent matching log events that occurred in that log stream between the starting time (inclusive, if desired) and the time stamp of the last matching log event (inclusive, if desired) from that log stream that was identified during the predetermined amount of time.

The log hosts 202a-n (and the archive data store 218, when applicable) may then send the log-event search results to an aggregator 208 configured to combine the log-event search results. In examples where the log hosts 202a-n searched the log streams 201a-n sequentially, the aggregator 208 may identify a last time stamp of a last log-event from each log stream of the log streams 201a-n that was searched. In other words, the aggregator 208 can identify a last time stamp of each log stream. The aggregator 208 can then identify the earliest last time stamp from the last time stamps of the log streams 201a-n. Then, the aggregator 208 may compile the matching log-event search results received from the log hosts 202a-n (and the data store 218, when applicable) into a combined list of log-event search results. The aggregator 208 may also sort the log events included in the combined list of log-event search results based on the time stamps of those included log events, which may effectively result in interleaving the log-events from the search results. In examples wherein the aggregator 208 identified an earliest last time stamp from the multiple log streams 201a-n, the combined list of log-event search results may only include log events whose time stamps range from the start time (e.g., provided in the search query) to the earliest last time stamp.

In one example configuration, there may be an upper limit or constraint on an amount of digital memory that the combined list of log-event search results may occupy. In examples where such an upper limit is applicable, the aggregator may truncate the combined list of log-event search results in order to comply with the upper limit and identify an earliest last time stamp representing where the combined list search results was truncated.

The token generator 206 may then generate a pagination token. The pagination token generator 206 may, for example, generate a pagination token that identifies the log group 219 being searched (or a sub-batch of log streams that belong to the log group 219, where applicable) and includes the last time stamp (e.g., the earliest last time stamp) of the last log event included in the combined list of log events. The pagination token may also include any additional searching criteria (e.g., keywords or log-event types) that were included in the search query.

The pagination token and the combined list of log events may then be sent to the search client 214 in response to the search query. The search client may then send the combined list (and the pagination token, in one example) to the external client 216 and the user. When additional log-event search results are desired (e.g., requested by the user via the external client 216), the search client 214 can send the pagination token to the front end search service 212. The front end search service 212 can use the pagination token to generate a next part of the search query. The start time of the next part (e.g., the next partition or segment) of the search query can be the last time stamp of the last log event included in the combined list of log events that was sent in response to the previous part or previous portion of the search query.

In examples where the previous part of the search query identified a sub-batch of log streams selected from the log group 219, the next part of the search query may identify either the same sub-batch of log streams or a next sub-batch of log streams. For example, if the log hosts 202a-n (and the archive data store 218, when applicable) were not able to complete the search of the log streams 201a-n in the sub-batch (e.g., sub-group) within the predetermined amount of time, the next part of the search query may identify the same sub-batch of log streams as the previous part search query. If the log hosts 202a-n (and the archive data store 218, when applicable) were able to complete the search of the log streams in the sub-batch within the predetermined amount of time, the next part of the search query may identify the next sub-batch of log streams in the log group 219 that are to be searched for the query.

The front end search service 212 may then send the next part of the search query to the back end search service 210. The back end search service 210 may then repeat the process described above (e.g., with regard to the first part of the search query) on the next part of the search query. The aggregator 208 and the token generator 206 may send a next combined list of log-event search results and a next pagination token to the search client 214 accordingly. If the log streams in the log group have been successfully and completely searched, the token generator 206 may send a termination token, such as a null value or some other value indicating that there are no additional search results to be obtained.

In one configuration of the technology, the log events may be metric data that is being collected for virtual resources in service provider environment. For example, the log events may be metric data that are performance metrics associated with an information management system, such as CPU metrics, storage metrics, service metrics, memory metrics, power metrics, website hit metrics, page view metrics, network traffic metrics, session metrics, and other types of performance metrics.

Services and modules included in the service provider environments described herein (e.g., in the figures) may be accessed using API calls, procedure calls or other network commands according to different technologies. Communication between the client devices and various components included in a service provider environment may be performed using technologies such as, but not limited to, Representational State Transfer (REST) technology or Simple Object Access Action (SOAP) technology. REST is an architectural style for distributed hypermedia systems. A RESTful API (which may also be referred to as a RESTful web service) is a web service API implemented using HyperText Transfer Protocol (HTTP) and REST technology. SOAP is an action for exchanging information in the context of Web-based services.

Figure 3:
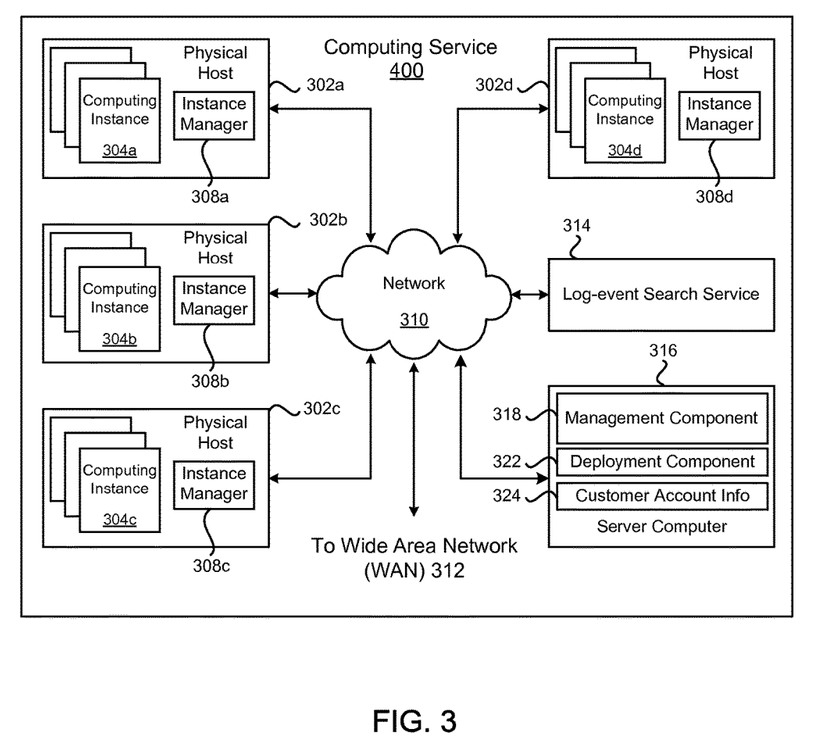
FIG. 3 is a block diagram illustrating an example computing service that may be used to execute software services in association with a log-event search service in accordance with an example.

FIG. 3 is a block diagram illustrating an example computing service 300 that may be used to execute software services in association with a log-event search service. In particular, the computing service 300 depicted illustrates one environment in which the technology described herein may be used. The computing service 300 may be one type of environment that includes various virtualized service resources that may be used, for instance, to host computing instances 304a-d on which a log-event search service may execute.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Illustratively, the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

Some of the servers may be used for executing the log-event search service. For example, a server computer 314 may execute a log-event search service that enables customers to partition a search performed on log events in multiple log streams that are generated by multiple hosts (e.g., computing instances).

One or more server computers 316 may be reserved to execute software components for managing the operation of the computing service 300 and the computing instances 304a-d. A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and provide other types of information. The deployment component 322 may utilize the customer-provided configuration and cache logic to configure, initialize, and launch computing instances 304a-d. The configuration, cache logic, and other information may be specified by a customer accessing the management component 318 or by may be provided directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified; many more networks and networking devices may be utilized to interconnect the various computing systems disclosed herein.

Figure 4:
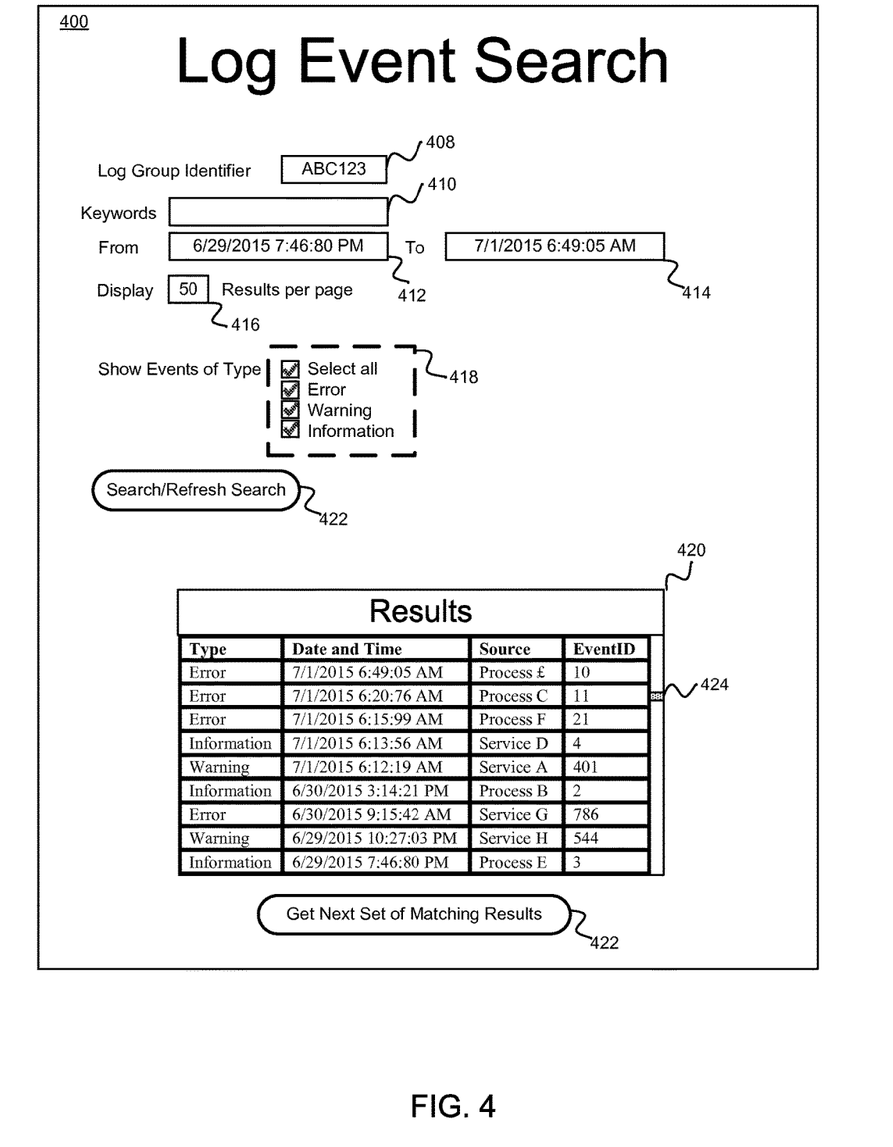
FIG. 4 illustrates an example of a graphical user interface (GUI) 400 through which a user may interact with a log-event search service in accordance with an example.

FIG. 4 illustrates an example of a graphical user interface (GUI) 400 through which a user may interact with a log-event search service. The GUI 400 may be executed on an external client computing device and may be in communication (e.g., via a network connection) with a search client that serves as an application layer (e.g., a liaison) between the external client computing device and the log-event search service. The computing device may be in communication with one or more peripherals that receive user input (e.g., a keyboard or a mouse) and the GUI 400 may be visually presented to a user on a display. There are many different types of displays that may be used to show the output of the GUI 400. Some non-limiting examples may include liquid crystal displays (LCD), OLED (organic light-emitting diode) displays, AMOLED (active matrix organic light-emitting diode) displays, gas plasma-based flat panel displays, projector displays, transparency viewer displays, head-mounted displays, and cathode ray tube (CRT) displays.

The GUI 400 may include a log-group-identifier field 408 in which a user may input an identifier that specifies a log group for a search query. The GUI 400 may also include a keyword field 410 in which a user may enter keywords for the search query. The GUI 400 may also include a starting-time field 412 and an ending-time field 414 in which a starting time and an ending time, respectively, may be entered for the search query. The GUI 400 may also include a results-per-page field 416 wherein the number of log-event search results to display at a single time in the results area 420 can be specified. In addition, the GUI 400 may include a type selection area 418 in which the user may specify one or more types of log events. When the search button 422 is clicked, a search query with the information from the log-group-identifier field 408, the keyword field 410, the starting-time field 412, the ending-time field 414, and the type selection area 418 may be submitted to the search client of the log-event search service.

The search client of the log-event search service may return a set of log-event search results that result from the search query. In other words, the set of log-event search results may be log events that: occurred in log streams associated with a log group identified in the log-groupidentifier field 408, contain one or more keywords specified in the keyword field 410, have time stamps ranging from the start time specified in the starting-time field 412 to the ending time specified in ending-time field 414, and are of types specified in the type selection area 418. The set of log-event search results can be displayed in the results area 420. If the number of log-event search results to display at a single time in the results area 420 specified in the results-per-page field 416 is less than the number of log events in the set of log-event search results, a scroll bar 424 can be provided to allow the user to scroll through the set of log-event search results. The log-event search results may be sequentially ordered.

The search client interacting with the log-event search service may also receive a pagination token from the log-event search service. When the user clicks on the next-set button 422, the pagination token can be sent back to the log-event search service. In response to receiving the pagination token, the log-event search service may send a next set of log-event search results that the search client may forward to the GUI 400 that is presented on the external client computing device. The next set of log-event search results may be sequentially ordered and may comprise a series of log events whose first log event has a time stamp that is chronologically later than the last time stamp of the (first) set of log-event search results.

The external client computing device used by a customer to interact with a log-event search service via the GUI 400 may include any device capable of sending and receiving data over a communications network. A computing device may comprise, for example, a processor-based system. Such a computing device may contain one or more processors, one or more memory modules, and a graphical user interface. A computing device may be a device such as, but not limited to, a desktop computer, a laptop or notebook computer, a tablet computer, a handheld computer, a smartphone, or another device with like capability.

While FIG. 4 illustrates an exemplary GUI interface, interfaces consistent with the present technology are not limited to GUIs. Command line interfaces (CLIs) may also be used (e.g., wherein commands and parameters are specified on a command line).

Figure 5:
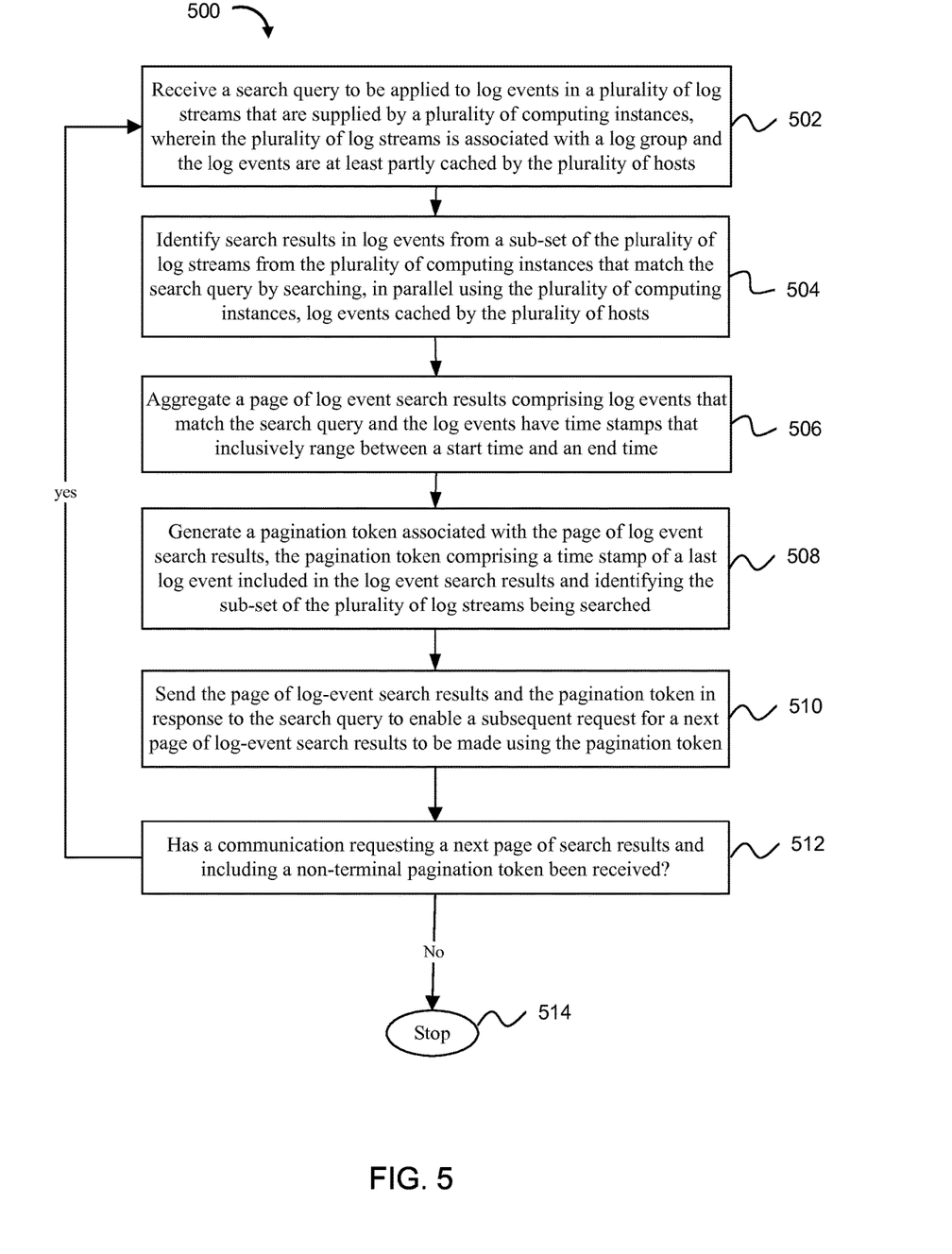
FIG. 5 is a flowchart illustrating exemplary functionality of a log-event search service in accordance with an example.

FIG. 5 illustrates exemplary functionality 500 of a log-event search service in accordance with an example. The functionality can be implemented as a method or the functionality can be executed as instructions on a machine, where the instructions are included on at least one non-transitory computer-readable storage medium.

As in block 502, one operation in accordance with the technology may be receiving a search query to be applied to log events produced for a plurality of log streams that are supplied by a plurality of computing instances, wherein the plurality of log streams is associated with a log group and the log events are at least partly cached by the plurality of computing instances. The plurality of log streams may be a divided into one or more sub-batches; each sub-batch may contain a predefined number of log streams.

As in 504, another action may be identifying search results in log events which match the search query, and the log events are retrieved from a sub-set of the plurality of log streams from the plurality of log servers by searching, in parallel, log events cached by the plurality of log servers. Additional search results can also be identified in log events from a sub-set of the plurality of log streams stored on the plurality of hosts that match the search query by searching log events archived in an archive data store.

As in block 506, another action in accordance with the technology may be aggregating a page of log event search results that match the search query from log events and the log events have time stamps that inclusively (or exclusively) range between a start time and an end time.

As in block 508, another operation may be generating a pagination token associated with the page of log event search results. The pagination token may include a time stamp of a last log event included in the log event search results and the sub-set of the plurality of log streams being searched may be stored in the pagination token. The log event search results included on the page may be sorted according to their respective time stamps. The pagination token may also comprise keywords or log-event types.

As in block 510, another action in accordance with the technology may be sending the page of log-event search results and the pagination token in response to the search query to enable a subsequent request for a next page of log-event search results to be executed using the pagination token.

As in block 512, another action in accordance with the technology may be determining whether a communication requesting a next page of search results has been received. If such a communication has been received, and the communication includes a non-terminal pagination token, the functionality 500 may be repeated. At each iteration of the functionality, the start time may be the time stamp of the last log event of the page of log-event search results from the previous iteration. If no communication is received or the communication includes a terminal pagination token (e.g., indicating that there are no additional log-event search results to be found), the functionality can stop as in block 514.

Figure 6:
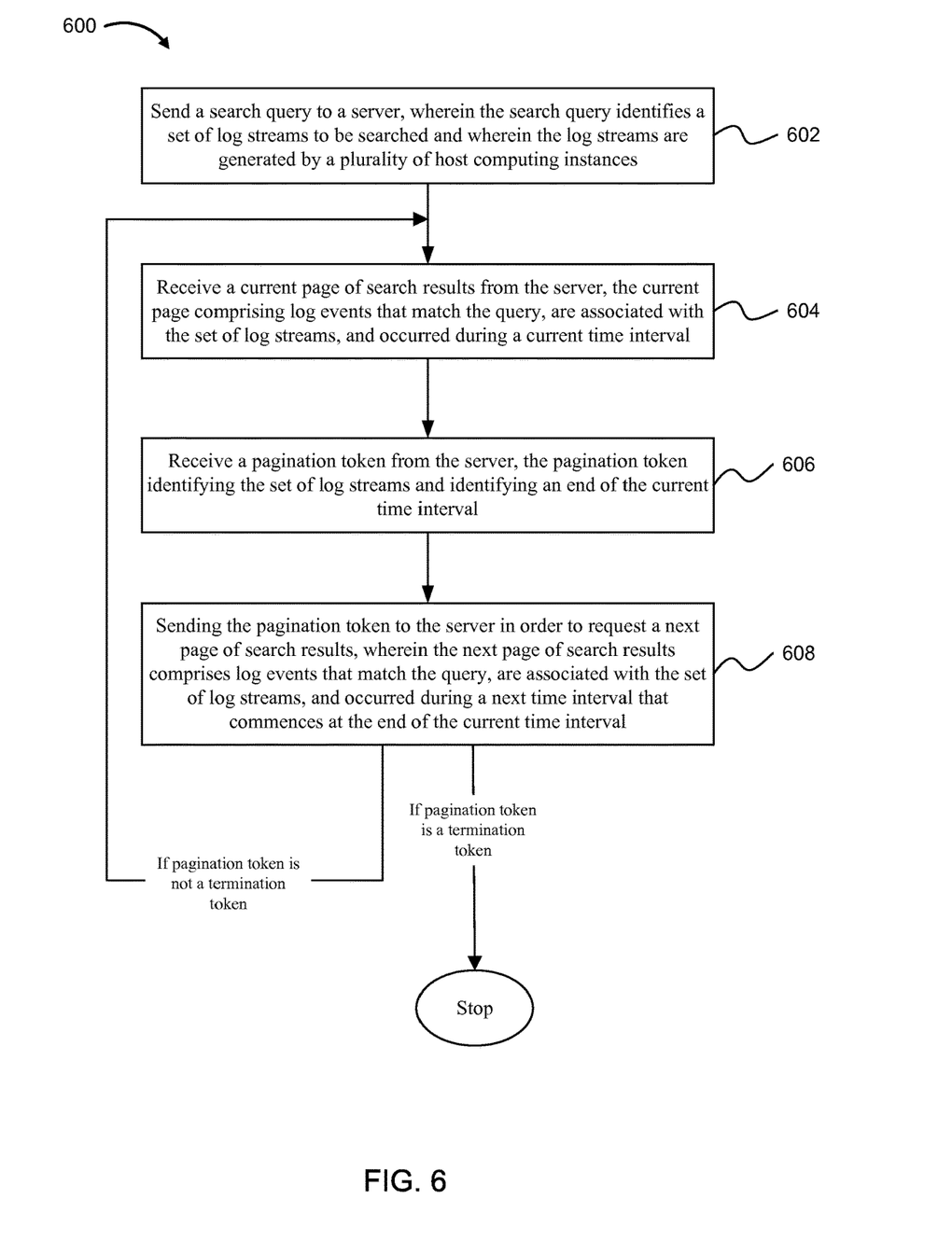
FIG. 6 is a flowchart illustrating exemplary functionality of a log-event search service in accordance with another example.

FIG. 6 illustrates exemplary operations 600 of a log-event search service in accordance with another example. The functionality can be implemented as instructions stored and executed on a machine, where the instructions are included on at least one non-transitory computer-readable storage medium.

As in block 602, an operation may be sending a search query to a server, wherein the search query identifies a set of log streams to be searched and wherein the log streams are stored by a plurality of host computing instances. The set of log streams may be a sub-batch containing a predefined number of log streams. The search query may be part of a pagination token that was previously received and the pagination token may signify that a previously initiated search, based on the search query, is to be resumed from a starting time indicated in the pagination token and performed upon a batch of log streams indicated by the pagination token.

As in block 604, another action in accordance with the technology may be receiving a current page of search results from the server, the current page comprising log events that match the query, are associated with the set of log streams, and occurred during a current time interval. If the search query received in block 602 is part of a pagination token, the current time interval may commence at a time indicated in the pagination token.

As in block 606, another action in accordance with the technology may be receiving a pagination token from the server, the pagination token identifying the set of log streams and identifying an end of the current time interval. The pagination token may also comprise keywords or log-event types and may identify a current sub-set (e.g., batch or sub-batch) of log streams in the set of log streams. The pagination token and current page of search results may be received within a predefined amount of time after sending the search query to the server so that a timeout operation does not occur at the client device. Each log event may have a time stamp and the current page of search results may have log events that match the search query and are sorted according to their time stamps.

As in block 608, another action may be sending the pagination token to the server in order to request a next page of search results, wherein the next page of search results comprises log events that match the query, are associated with the set of log streams, and occurred during a next time interval that commences at the end of the current time interval. The functionality described in blocks 604 through 608 may then be repeated, wherein the next page and the time interval of block 608 become the current page and the current time interval, respectively, of block 604 at each iteration. Alternatively, if the pagination token is a termination token indicating that there are no additional pages of search results to be requested, the functionality can be stopped.

Figure 7:
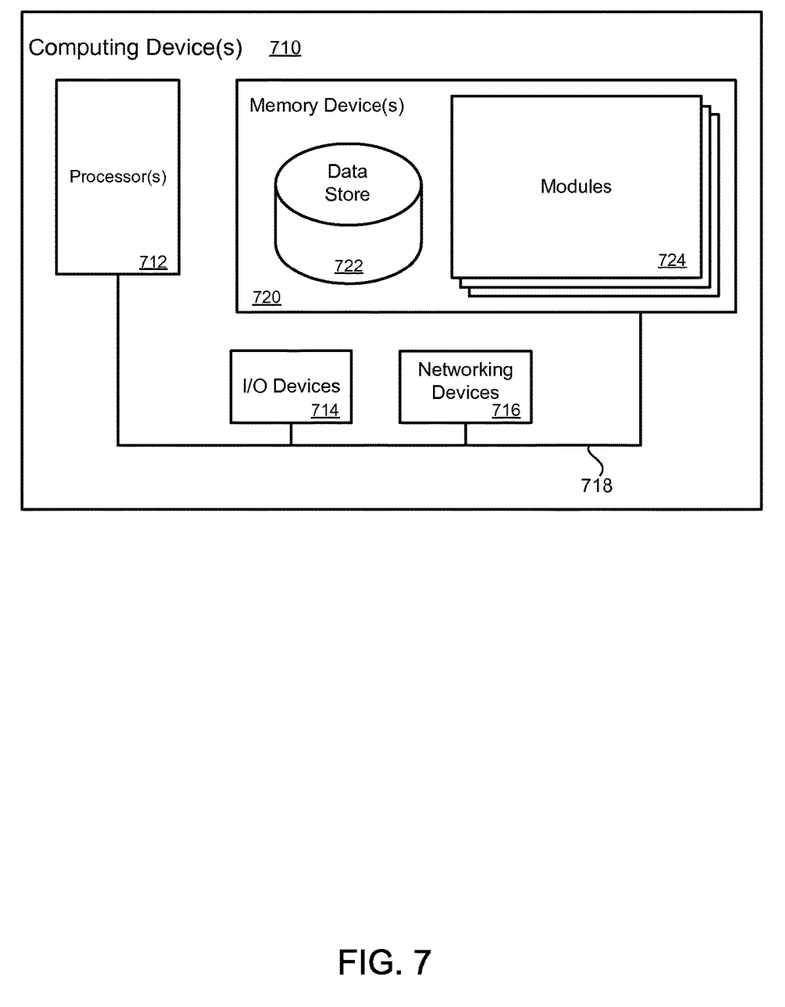
FIG. 7 illustrates a computing device on which modules of the present disclosure technology may be executed.

FIG. 7 illustrates a computing device 710 on which modules of this technology may execute. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules that are executable by the processor(s) 712 and data for the modules. Located in the memory device 720 are services and modules executable by the processor. The modules may execute the functions described earlier. A data store 722 may also be located in the memory device 720 for storing data related to the modules and other applications along with an operating system that is executable by the processor(s) 712.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Other applications may also be stored in the memory device 720 and may be executable by the processor(s) 712. Components or modules discussed in this description may be implemented in the form of software using high programming level languages that are compiled, interpreted, or executed using a hybrid of the methods.

The computing device may also have access to I/O (input/output) devices 714 that are usable by the computing devices. An example of an I/O device is a display screen 740 that is available to display output from the computing devices. Other known I/O devices may be used with the computing device as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, solid state memory, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the technology be limited, except as by the claims set forth below.

The technology described here may also be stored on a computer readable storage medium that includes volatile and non-volatile, removable and non-removable media implemented with any technology for the storage of information such as computer readable instructions, data structures, program modules, or other data. Computer readable storage media include, but are not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatuses and networking connections that allow the devices to communicate with other devices. Communication connections are an example of communication media. Communication media typically embodies computer readable instructions, data structures, program modules, and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared, and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

What is claimed is:

1. A method for partitioning a search performed on log events in multiple log streams, the method comprising:
    receiving a search query at a log group identifier field of a graphical user interface, wherein the search query identifies a log group for searching log events in a plurality of log streams that are supplied by a plurality of log hosts, wherein the plurality of log streams are associated with the log group;
    identifying search results having log events from a sub-set of the plurality of log streams from the plurality of log hosts and the search results are retrieved by searching, in parallel, log events in the plurality of log hosts;
    aggregating a page of log event search results comprising log events retrieved by the plurality of log hosts in response to the search query and the log events have log event time stamps, wherein the page of log event search results is sorted according to the log event time stamps;
    generating a pagination token associated with the page of log event search results, the pagination token comprising a time stamp of a last log event included in the log event search results and identifying the sub-set of the plurality of log streams being searched including a period of time used as input for searching the log events with a starting time and an ending time used as parameters to define a range for the search query, wherein the time stamp of the last log event serves as the ending time for the page of log event search results; and
    sending the page of log event search results and the pagination token in response to the search query to enable a subsequent request for a next page of log-event search results to be made using the pagination token.

2. The method of claim 1, further comprising identifying additional search results in log events from a sub-set of the plurality of log streams from the plurality of hosts that satisfy the search query by searching log events archived in an archive data store.

3. The method of claim 1, wherein the log events are at least partially cached by the plurality of log hosts.

4. The method of claim 1, wherein the sub-set of the plurality of log streams is a sub-batch containing a predefined number of log streams from the log group.

5. A method, comprising:
    receiving a search query identifying a log group that is to be searched and the log group is stored on a plurality of hosts, wherein a host is associated with a log stream and log events in the log stream have log event time stamps;
    sending a communication to the plurality of hosts requesting log events that satisfy the search query;
    receiving the log events from the plurality of hosts;
    aggregating the log events into a list, wherein the log events included in the list are sorted according to the log event time stamps;
    generating a pagination token having the time stamp of a last log event in the list and an identifier specifying a set of log streams being searched including a starting time and an ending time used as parameters to define a range for the search query, wherein the time stamp of the last log event serves as the ending time for the list of the log events; and
    sending the list and the pagination token to a search client to enable a subsequent request for a next list of log events, which satisfy the search query, in order for the search to re-commence.

6. The method of claim 5, wherein sending the list and the pagination token occurs within a predefined time interval after receiving the search query in order to prevent a timeout operation at the search client.

7. The method of claim 5, further comprising:
    identifying additional log events that match the search query, wherein the additional log events are stored in an archive data store; and
    merging the additional log events into the list.

8. The method of claim 7, wherein the pagination token further comprises keywords or log-event types.

9. The method of claim 5, wherein the log group further comprises a plurality of log streams that can be partitioned into sub-batches wherein each sub-batch contains a number of log streams.

10. The method of claim 5, wherein the log events are cached at the plurality of hosts.

11. A non-transitory computer-readable medium containing instructions thereon which, when executed by one or more processors, perform the following:
    receiving a search query at a log group identifier field of a graphical user interface, the search query identifying a log group of log streams that are to be searched, wherein log events in the log streams are cached on a plurality of hosts, wherein a host is associated with at least one log stream in the log group and a log event has a log event time stamp;
    sending a communication to the plurality of hosts requesting log events in the log streams of the log group that satisfy the search query;

receiving a set of log events satisfying the search query from the plurality of hosts;

aggregating the set of log events satisfying the search query into a list wherein, the list is sorted according to log event timestamps;

generating a pagination token having a time stamp of a last log event in the list and an identifier specifying the log group being searched including a period of time automatically selected by a log event search service based on one or more rules for searching the log events with a starting time and an ending time used as parameters to define a range for the search query, wherein the time stamp of the last log event serves as the ending time for the list of the set of log events; and sending the list and the pagination token to a search client to enable a subsequent request for a next list of log events satisfying the search query in order to enable a search based on the search query to be resumed chronologically from the time stamp of the last log event in the list and from the ending time.

12. The non-transitory computer-readable medium of claim 11, further containing instructions thereon which, when executed by one or more processors, perform the following:

identifying additional log events that match the search query, wherein the additional log events are stored in an archive data store; and merging the additional log events into the list.

13. The non-transitory computer-readable medium of claim 11, further containing instructions thereon which, when executed by one or more processors, perform the following:

sending the list and the pagination token within a predefined time interval after receiving the search query in order to prevent a timeout operation at the search client.

14. The non-transitory computer-readable medium of claim 11, further containing instructions thereon which, when executed by one or more processors, perform the following:

partitioning the log streams of the log group into batches of log streams, wherein each batch includes up to a predefined number of log streams;

sending a communication to the plurality of hosts requesting log events in a first batch that satisfy the search query;

receiving a set of log events from the first batch satisfying the search query from the plurality of hosts;

aggregating the set of log events from the first batch satisfying the search query into the list; and generating a pagination token having a time stamp of a last log event in the list, an identifier specifying the log group, and an identifier specifying the first batch.

15. The non-transitory computer-readable medium of claim 11, wherein the search query includes a start time and log events satisfying the search query have time stamps commencing from the start time.

16. The non-transitory computer-readable medium of claim 15, wherein the search query includes an end time and log events satisfying the search query have time stamps ranging from the start time to the end time.

* * * * *